(12) United States Patent
Dutta et al.

(10) Patent No.: US 9,862,859 B2
(45) Date of Patent: Jan. 9, 2018

(54) POROUS AIR PERMEABLE POLYTETRAFLUOROETHYLENE COMPOSITES WITH IMPROVED MECHANICAL AND THERMAL PROPERTIES

(71) Applicant: W. L. Gore & Associates, Inc., Newark, DE (US)

(72) Inventors: Anit Dutta, Wilmington, DE (US); Leslie S. Nachbar, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 14/850,434

(22) Filed: Sep. 10, 2015

(65) Prior Publication Data
US 2016/0075915 A1 Mar. 17, 2016

Related U.S. Application Data

(63) Continuation-in-part of application No. 14/484,392, filed on Sep. 12, 2014, now abandoned.

(51) Int. Cl.
*C09D 179/08* (2006.01)
*B32B 5/32* (2006.01)
(Continued)

(52) U.S. Cl.
CPC ....... *C09D 179/08* (2013.01); *B01D 67/0088* (2013.01); *B01D 69/02* (2013.01);
(Continued)

(58) Field of Classification Search
CPC . B32B 5/32; B32B 2255/26; B32B 2266/025; B32B 2307/724; C08J 7/04; C08J 5/2293; C09D 179/08
See application file for complete search history.

(56) References Cited

U.S. PATENT DOCUMENTS 3,953,566 A 4/1976 Gore
4,849,284 A 7/1989 Arthur et al.
(Continued)

FOREIGN PATENT DOCUMENTS

EP 1754528 8/2006
EP 1882514 7/2007
(Continued)

*Primary Examiner* — Hai Vo
(74) *Attorney, Agent, or Firm* — Amy L. Miller

(57) ABSTRACT

Porous air permeable expanded PTFE composite with enhanced mechanical and thermal properties are described. The node and fibril microstructure of expanded PTFE is coated on and within the node and fibril microstructure with a suitably chosen polymer to impart property enhancement while maintaining porosity. The coating polymer content of the composite is maintained between 3 and 25 weight percent of the composite and the areal mass of the composite is less than 75 gm/m². Exemplary enhancement to properties may include, among others, Average Tensile Strength (ATS) (in MPa)×Z strength (in MPa) of 50 MPa² or greater, preferably 100 MPa² or greater, with air flow less than 500 Gurley seconds. Coating polymers with appropriate temperature resistance provides composites which further exhibit shrinkage of less than 10% at temperatures up to 300° C. with air flow of less than 500 Gurley seconds.

17 Claims, 6 Drawing Sheets

(51) Int. Cl.

| | | |
|---|---|---|
| *C09D 175/04* | (2006.01) | |
| *B32B 5/20* | (2006.01) | |
| *B01D 67/00* | (2006.01) | |
| *B01D 69/02* | (2006.01) | |
| *B01D 71/36* | (2006.01) | |
| *C08J 5/22* | (2006.01) | |
| *C08J 7/04* | (2006.01) | |
| *B01D 71/54* | (2006.01) | |
| *B01D 71/64* | (2006.01) | |
| *B29C 55/00* | (2006.01) | |

(52) U.S. Cl.
CPC ............... *B01D 71/36* (2013.01); *B32B 5/20* (2013.01); *B32B 5/32* (2013.01); *C08J 5/2293* (2013.01); *C08J 7/047* (2013.01); *C09D 175/04* (2013.01); *B01D 71/54* (2013.01); *B01D 71/64* (2013.01); *B01D 2325/22* (2013.01); *B01D 2325/24* (2013.01); *B29C 55/005* (2013.01); *B32B 2255/10* (2013.01); *B32B 2255/26* (2013.01); *B32B 2266/025* (2013.01); *B32B 2266/06* (2013.01); *B32B 2307/724* (2013.01); *C08J 2475/04* (2013.01); *C08J 2479/08* (2013.01)

(56) References Cited

U.S. PATENT DOCUMENTS

| | | | |
|---|---|---|---|
| 4,985,296 | A | 1/1991 | Mortimer, Jr. |
| 5,130,024 | A | 7/1992 | Fujimoto et al. |
| 5,209,850 | A | 5/1993 | Abayasekara et al. |
| 5,354,587 | A | 10/1994 | Abayasekara et al. |
| 5,476,589 | A | 12/1995 | Bacino |
| 5,708,044 | A | 1/1998 | Branca |
| 5,874,165 | A | 2/1999 | Drumheller |
| 5,972,449 | A | 10/1999 | Chung |
| 6,074,738 | A | 6/2000 | VonFragstein et al. |
| 6,218,000 | B1 | 4/2001 | Rudolf et al. |
| 6,451,396 | B1 | 9/2002 | Zumbrum et al. |
| 6,541,589 | B1 | 4/2003 | Baillie |
| 6,737,158 | B1 | 5/2004 | Thompson |
| 7,049,380 | B1 | 5/2006 | Chang et al. |
| 7,306,729 | B2 | 12/2007 | Bacino et al. |
| 7,531,611 | B2 | 5/2009 | Sabol et al. |
| 7,923,054 | B2 | 4/2011 | Dutta et al. |
| 8,048,440 | B2 | 11/2011 | Chang et al. |
| 8,075,669 | B2 | 12/2011 | Meindl et al. |
| 8,637,144 | B2 | 1/2014 | Ford |
| 2004/0026245 | A1 | 2/2004 | Agarwal et al. |
| 2004/0059717 | A1 | 3/2004 | Klare et al. |
| 2004/0259446 | A1* | 12/2004 | Jain .................. A62D 5/00 442/59 |
| 2005/0185867 | A1 | 8/2005 | Chu et al. |
| 2006/0201874 | A1* | 9/2006 | Klare ............... B01D 67/0011 210/500.36 |
| 2007/0075014 | A1 | 4/2007 | Olson et al. |
| 2007/0272606 | A1 | 11/2007 | Freese et al. |
| 2009/0191398 | A1 | 7/2009 | Moore et al. |
| 2010/0167100 | A1* | 7/2010 | Moore ............... B01D 67/0088 429/494 |
| 2010/0248324 | A1 | 9/2010 | Xu et al. |
| 2012/0064273 | A1 | 3/2012 | Bacino |

FOREIGN PATENT DOCUMENTS

| | | |
|---|---|---|
| EP | 1527335 | 7/2012 |
| WO | WO2006/127946 | 11/2006 |
| WO | WO2009/013340 | 1/2009 |
| WO | WO2013/066932 | 5/2013 |

* cited by examiner

POROUS AIR PERMEABLE POLYTETRAFLUOROETHYLENE COMPOSITES WITH IMPROVED MECHANICAL AND THERMAL PROPERTIES

FIELD

The present invention relates generally to porous, air permeable composites having improved mechanical and thermal properties, wherein the composites comprise porous polytetrafluoroethylene having thereon at least one polymeric coating to impart the property enhancements while maintaining porosity within the composite.

BACKGROUND

Porous polytetrafluoroethylene (PTFE) materials, including expanded PTFE (ePTFE), are described in a number of patents such as U.S. Pat. No. 3,953,566 to Gore, U.S. Pat. No. 5,476,589 to Bacino, and U.S. Pat. No. 7,306,729 to Bacino et al. These porous PTFE materials represent a family of valuable engineered material useful in numerous applications in widely varied industries such as aerospace, automotive, chemical processing, filtration, medical devices, protective clothing and alternate energy, to name but a few of the possible product applications.

In some of these product applications, ePTFE and other porous PTFE materials are treated to enhance or impart additional properties specifically tailored for the targeted application. For example, ePTFE, which is inherently hydrophobic, and thus is not ideally suited for application requiring compatibility with aqueous solutions, can be treated or coated to render the node and fibril microstructure of the ePTFE material hydrophilic. U.S. Pat. No. 5,130,024 to Fujimoto et al., U.S. Pat. No. 5,354,587 and U.S. Pat. No. 5,209,850 to Abayasekara, U.S. Pat. No. 5,874,165 to Drumheller, U.S. Pat. No. 7,923,054 to Dutta et al., US Application 20090191398 to Moore, US Application 2013066932 to Zheng and WO2009013340 to Hoving et al., are exemplary patents and patent applications primarily directed towards increasing the surface energy of ePTFE by using a minimal amount of hydrophilic material so as not to change the porosity & and fluid permeability appreciably. Such hydrophilic treatments discussed in the prior art do not have significant effect on the mechanical properties of the ePTFE.

In other teachings ePTFE has been rendered oleophobic by treating the node and fibril structure with fluorinated materials to further lower the surface energy. U.S. Pat. No. 5,972,449 to Chung, U.S. Pat. No. 6,074,738 to Von Fragstein et al., U.S. Pat. No. 8,075,669 to Meindl, EP 1,527,335 to Agarwal, WO2006127946/ US Pat. Publn. 20070272606 to Freese and EP 1,754,528 to Deyoung are some examples of these oleophobic treatments of ePTFE. Here too, the primary goal of these patents is to lower the surface energy of the ePTFE by using minimal amounts of the oleophobic material so as not to change the porosity and fluid permeability. These oleophobic treatments are not intended to change the mechanical properties of the ePTFE significantly.

So far not much has been reported in the prior art regarding enhancing the mechanical and thermal properties of ePTFE while retaining the porous characteristics of the ePTFE material. As mentioned earlier, ePTFE is an advantageous material and is used in a wide variety of industrial and commercial applications ranging from protective clothing to medical devices to battery separators to filtration.

In the past, few approaches have been used to improve mechanical properties of ePTFE. In one example, Burger at al. in U.S. Pat. No. 6,127,486, taught the creation of a co-continuous micro-porous structure by using a blend of a thermoplastic polymer with PTFE in order to make ePTFE resistant to mechanical degradation by gamma radiation. A challenge with this method is that the thermoplastic needs to be capable of surviving the high temperature processing involved in making of ePTFE. Other examples of efforts to improve mechanical properties in the art include U.S. Pat. No. 4,949,284 to Arthur and U.S. Pat. No. 6,218,000 to Rudolf at al., which describe the use of ceramic fillers in ePTFE processing to improve properties such as dimensional stability and abrasion resistance, respectively. In these cases, the discrete fillers are entrapped within the node and fibril structure of the ePTFE. A limitation of this approach is that only fillers that can survive the high temperature ePTFE processing can be used. In addition, the potential for particulation and contamination from the filler is not desirable in many applications, such as in medical and electronic devices. Various other approaches have been used to improve mechanical properties of ePTFE. For example, U.S. Pat. No. 6,451,396 to Zumbrum teaches the improvement of flex endurance and U.S. Pat. No. 6,737,158 to Thompson teaches the improvement of resistance to fracture by filling the pores of the ePTFE with suitable polymer matrices. However, the resulting composites add significant mass relative to the ePTFE material alone. Also, these materials are not described as possessing adequate "through" porosity and thus are not permeable to fluids. These approaches therefore cannot be used where air and other fluid (e.g., moisture vapor, gas, water, etc.,) permeability is a requirement.

A need exists for improved ePTFE materials with enhanced mechanical (e.g. abrasion resistance, creep resistance, compression resistance, etc.) and thermal (e, g., shrinkage upon heating) properties without adding substantial mass to the ePTFE material or adversely affecting the porous characteristics of the ePTFE material. Such enhanced ePTFE materials can be valuable by enabling additional application possibilities in diverse industries particularly where size, space or weight is a constraint.

Therefore, there continues to be a need for creating porous, air permeable ePTFE composites with improved mechanical and thermal properties without the limitations mentioned above.

SUMMARY

The present disclosure is directed to a porous air permeable ePTFE composite with enhanced mechanical and thermal properties. In particular, this invention describes a node and fibril microstructure of expanded PTFE (ePTFE) that has been coated on and within the node and fibril microstructure with a suitably chosen polymer to impart the property enhancement while maintaining the porosity that contributes to fluid permeability. The coating polymer content of the composite is maintained between 3 and 25 weight percent of the composite, preferably between 5 and 20 weight percent. Furthermore, this invention is directed to a porous, air permeable PTFE composite having an areal mass of less than 75 gm/m$^2$, preferably less than 50 gm/m$^2$ and most preferably less than 35 gm/m$^2$ and an Average Tensile Strength (ATS) (in MPa)×Z strength (in MPa) (i.e., the measure of the cohesive strength of the membrane in the thickness direction of the material) value of at least 50 MPa$^2$, preferably at least 100 MPa$^2$ while maintaining an air flow of less than 500 Gurley seconds. In an alternative embodiment of the present invention, when selecting coating polymers with appropriate temperature resistance, the resulting composites further exhibit a shrinkage of less than 10% at temperatures up to 300° C. while maintaining an air flow of less than 500 Gurley seconds.

DETAILED DESCRIPTION

Figure 1:
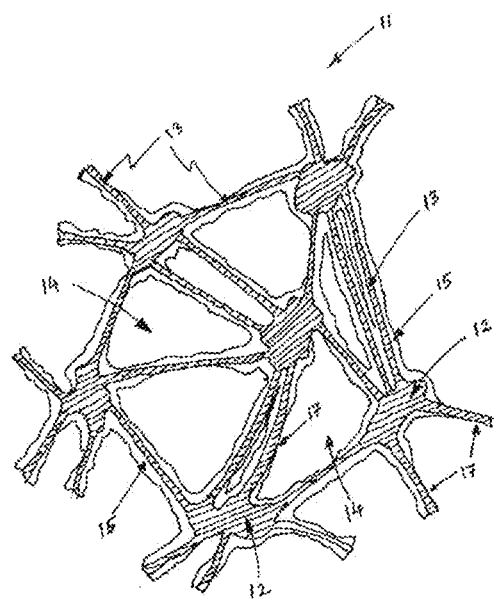
FIG. 1 is a schematic drawing of the coated microstructure of the porous PTFE composite of the present invention.

The present invention is directed to porous, air-permeable ePTFE composite materials with improved mechanical and thermal properties. FIG. 1 shows a schematic of the cross-section of an embodiment of an ePTFE composite 11 of the present invention. The microstructure of ePTFE includes in this embodiment nodes 12 and interconnecting fibrils 13. The pores 14 are void space within the ePTFE microstructure. The surface of the ePTFE microstructure is coated with a polymer 15 while still permitting air flow as measured in Gurley seconds. It is within the scope of the invention that small regions, such as depicted with reference 17, of the ePTFE surface may not be covered by the polymer 15; however, the ePTFE surfaces are generally covered by the polymer in order to obtain improved mechanical and thermal properties. Suitable polymeric coatings of the present invention for enhancing mechanical properties of the composite are described in more detail later herein. In an alternative embodiment of the invention, for example, when the composites are exposed in end use to temperatures up to 300° C. and require dimensional stability at such high temperatures, selected high temperature polymers are particularly suited and are described in more detail later herein.

As noted earlier in this application, exemplary ePTFE starting materials suitable for use in the present invention are described in a number of patents such as, for example, U.S. Pat. No. 3,953,566 to Gore, U.S. Pat. No. 5,476,589 to Bacino, and U.S. Pat. No. 7,306,729 to Bacino et al. In U.S. Pat. No. 3,953,966, Gore teaches a method to create ePTFE with a porous microstructure consisting of nodes and fibrils. Bacino, in U.S. Pat. No. 5,476,589, teaches the creation of an ePTFE with a non-woven like microstructure consisting of substantially fibrils. In U.S. Pat. No. 7,306,729, Bacino et al. teaches the creation of porous PTFE membranes possessing a microstructure leading to high strength and small pore size. Expanded PTFE (ePTFE) membranes for the present invention typically have an areal mass of 75 gm/m$^2$ or less, preferably 50 gm/m$^2$ or less and most preferably 35 gm/m$^2$ or less. Such ePTFE membranes with a range of microstructures are commercially manufactured by W.L. Gore and Associates, Inc. (Newark, Del.).

Expanded polytetrafluoroethylene (ePTFE) is referred to herein for ease of discussion, but it is to be appreciated that expanded PTFE, expanded modified PTFE, and expanded copolymers of PTFE are all considered to be within the purview of the invention. Patents have been filed on expandable blends of PTFE, expandable modified PTFE, and expanded copolymers of PTFE, such as U.S. Pat. No. 5,708,044 to Branca; U.S. Pat. No. 6,541,589 to Baillie; U.S. Pat. No. 7,531,611 to Sabol et al.; U.S. patent application Ser. No. 11/906,877 to Ford; and U.S. patent application Ser. No. 12/410,050 to Xu et al.

Expanded PTFE components of the composites of the present invention may comprise a single ePTFE layer or multiple ePTFE layers, and the microstructure of the multi-layer components may be uniform from layer to layer or within layers, or alternatively, the layers may be non-uniform from layer to layer or even within layers, all depending on the desired characteristics of the material in a given end use. Moreover, the layers may be combined prior to coating, or alternatively, may be coated separately and then layered together. In one non-limiting alternative embodiment of the invention, the starting ePTFE structure may comprise a layered structure where one or more of the outer layers of ePTFE had a microstructure having a more open porosity (higher air flow) than the microstructure of one or more inner layers of ePTFE (lower air flow), and the resulting coated composite exhibits a corresponding structure and performance.

In addition, the incorporation of filler materials in various forms within the conformable ePTFE tape and/or ePTFE membranes is also considered to be within the purview of the invention. Non-limiting examples of suitable filler materials include carbon black, aerogels, metals, semi-metals, ceramics, carbon/metal particulate blends, activated carbon, and the like. Filler materials may be incorporated into the ePTFE tape and/or ePTFE membrane by conventional methods, such as, but not limited to, those described in U.S. Pat. No. 4,995,296 to Mortimer, Jr.

The present invention creates an ePTFE composite by coating the surface of the ePTFE microstructure with at least one suitable polymer. Thus, the polymer coating exists throughout the thickness of the ePTFE. As noted earlier herein, it is within the scope of the invention that small regions of the ePTFE microstructure may not be covered by the polymer; however, the ePTFE surfaces are generally covered by the polymer in order to obtain improved mechanical and thermal properties. This is schematically shown in one embodiment in FIG. 1 with 15 being the polymer coating layer that is covering the nodes 12 and fibrils 13 of the ePTFE microstructure. As mentioned above, it is possible to have some parts of the ePTFE microstructure without the polymer coating as indicated by 17. As long as 17 represents only a minor fraction of the entire ePTFE microstructure, it is not expected to impact the overall improvement in mechanical properties.

The amount of the polymer used to coat the ePTFE microstructure can be varied and is dictated by the extent of the property enhancement that is desired versus the change in porosity and air flow that is acceptable. Excessive amount of coating would occlude the pores of the ePTFE resulting in significant loss in airflow. On the other hand, insufficient amount of polymer coating will result in marginal improvement in the mechanical property. Thus, the amount of polymer coating used to create the porous composite of this invention should be between 3 and 25 weight percent of the resulting ePTFE composite; preferably between 5 and 20 weight percent. Depending on the specific characteristics of the polymers used to coat the ePTFE microstructure, the polymer content of the composite can be determined using different analytical techniques commonly known to those skilled in the art. For example, if applicable, the polymer content can be determined gravimetrically by digesting or dissolving the polymer out of the composite. Alternatively, thermal techniques such as thermogravimetric analysis (TGA) or differential scanning calorimetry (DSC) can be used. For example, if the degradation temperature range of the polymer coating material is significantly different from that of PTFE; then TGA can be used to determine the polymer content of the coating material. Spectroscopic techniques such as solid-state NMR can be suitable for determining the polymer content particularly for temperature resistant coating polymers (e.g. polyimide, polybenzimidazoles etc.) that thermally degrade in the same temperature range as PTFE thereby making the TGA technique unsuitable.

Figure 2:
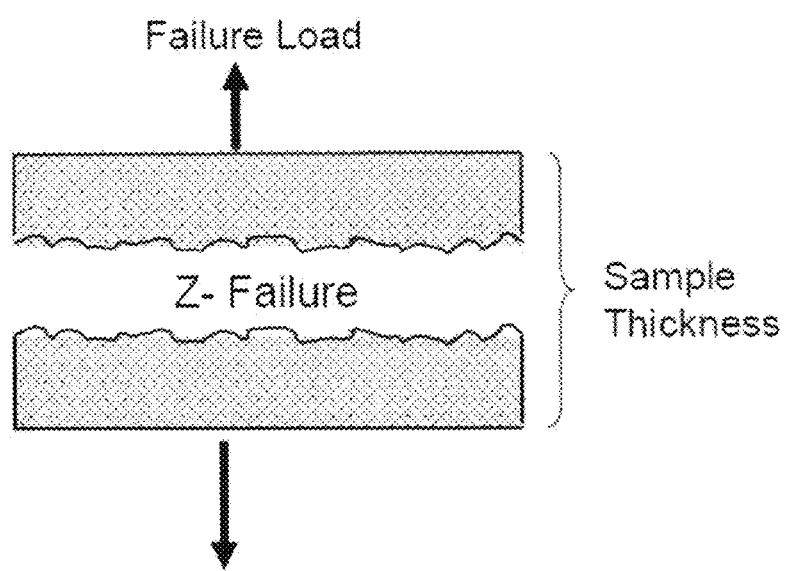
FIG. 2 is a schematic drawing indicating the failure in z-direction.
Figure 7:
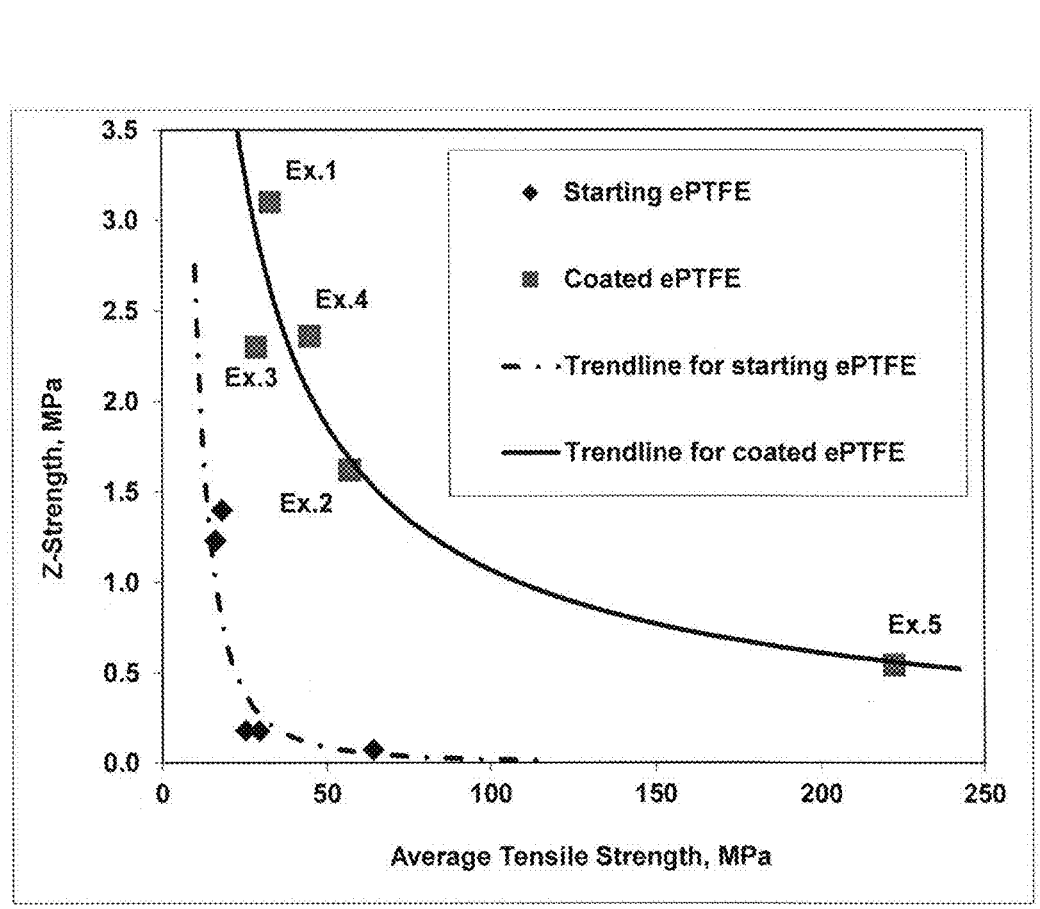
FIG. 7 is a graph showing the Z-strength versus ATS for both the inventive materials from the examples herein and the uncoated starting membranes (i.e., prior art membranes).

The choice of coating polymer or polymers is dictated by the specific property or properties targeted for improvement. Z-strength of ePTFE substrate is an important mechanical property for many applications. As shown schematically in FIG. 2, Z-strength is the amount of stress required in the thickness or Z direction of the substrate to cause failure due to splitting of the sample. Z-strength of ePTFE can vary over a broad range depending on the thickness and the microstructure. In general, Z-strength is lowered as the ePTFE microstructure becomes more fibrillar than nodal. As shown in FIG. 7 for ePTFE membranes, this is usually accompanied by significant increase in the tensile strength of the ePTFE in the planar x and y directions. The average tensile strength (ATS) of the ePTFE can be conveniently represented by the following equation:

$$ATS = (\text{Tensile strength in } x\text{-direction} + \text{Tensile Strength in } y\text{-direction})/2$$

where x and y are orthogonal directions in the plane of the material. For purposes of characterizing the unique aspects of this invention, the measure of the ATS×Z-strength is an important value which defines the unique aspects of composites of the present invention, particularly when distinguishing over prior art composite materials. In general the goal is to coat the ePTFE node and fibril microstructure throughout the thickness of the microstructure with the chosen polymer or polymers without significantly occluding the pores. In order to improve the Z-strength of the ePTFE membrane, the coating polymer needs to be stronger than the underlying ePTFE membrane. Thus, the polymer selected to coat the ePTFE microstructure should have a tensile strength that is significantly higher (for example, at least about 5 times greater) than the Z-strength of the ePTFE membrane before coating. Tensile strength values of various polymers are readily available in the reference literatures as well as in various polymer material related websites such as www.omnexus.com and www.curbellplastics.com. The presence of the polymer coating throughout the thickness of the composite may be confirmed through suitable analytical techniques apparent to one of skill in the art and depending on the composition of the polymer being evaluated or detected. For example, FTIR (Fourier transform infrared spectroscopy), Raman FTIR and other suitable analytical techniques may be used to determine the presence of a polymer coating through the thickness of the composite As shown in FIG. 7, the present invention significantly enhances the Z-strength of ePTFE membranes. An added benefit of the invented ePTFE composite is that the increase in Z-strength is also accompanied by an increase in tensile strength in both the down-web or machine direction (MD) and in the cross-web or transverse direction (TD). The magnitude of this increase, however, depends on the ATS of the ePTFE substrates used. With this benefit, it is possible to achieve minimum Z-strength of 0.4 MPa at high ATS values for the porous ePTFE composites of this invention. In comparison, as seen from FIG. 7, the Z-strength of ePTFE membranes with similar ATS values would be considerably lower (e.g. less than 0.1 MPa).

Figure 8:
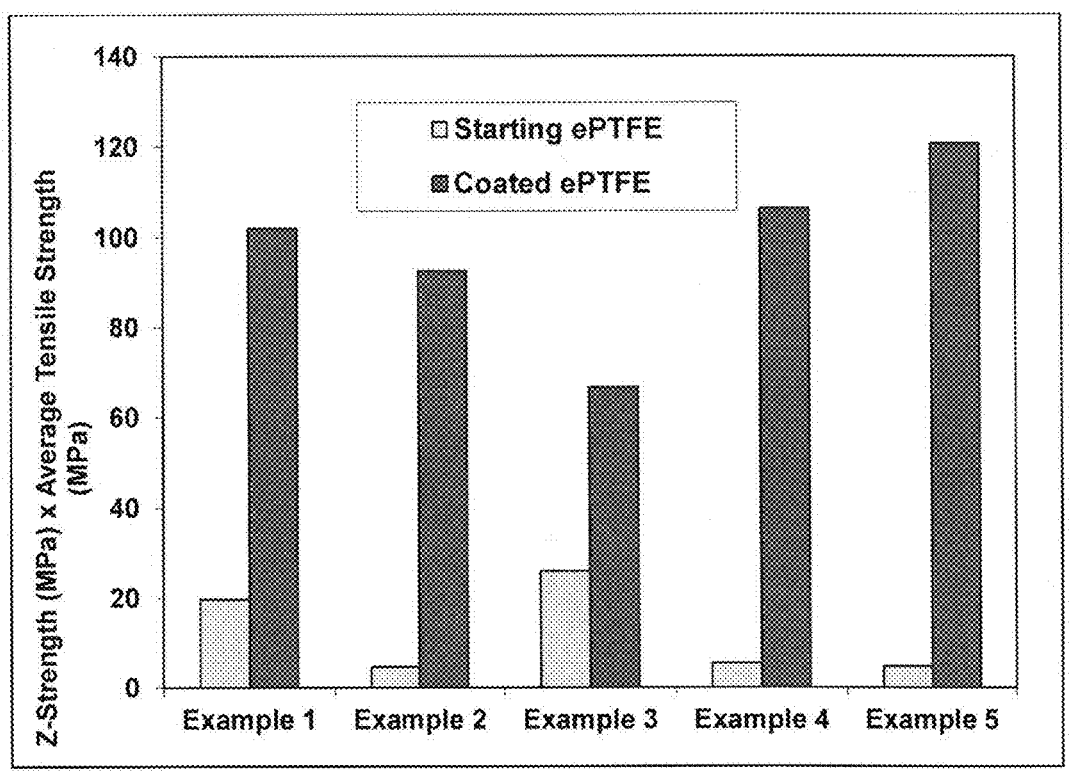
FIG. 8 shows the ATS×Z-strength values for the composites of this invention as compared with that of the starting ePTFE membranes.

With the approach described above for creating the novel composites of the present invention, as shown in FIG. 8, it is possible to achieve ATS×Z-strength of at least 50 $(\text{MPa})^2$ and preferably at least 100 $\text{MPa}^2$ for the porous ePTFE composites. Additionally, FIG. 8 is a graph showing the ATS×Z-strength values for both the inventive materials from the examples herein and the uncoated starting membranes (prior art) for those examples. The Figure shows that the ATS×Z-strength values are typically low and less than 30 $\text{MPa}^2$ for ePTFE membranes. Also for comparison, the ATS×Z-strength values of prior art ePTFE composites such as conventional hydrophilic and oleophobic ePTFE membranes are typically low and similar to that of the uncoated ePTFE membranes mentioned above. In the present invention, through appropriately selected polymer coating of the ePTFE microstructure; the ATS×Z-strength values can be considerably increased to values of 50 $\text{MPa}^2$ and higher, preferably to values of 100 $\text{MPa}^2$ and higher.

Expanded PTFE membranes, with the node & fibril microstructure, are the preferred starting material to create the composites of the present invention. Expectedly, the areal mass of the composite depends both on the areal mass of the starting ePTFE membrane and the amount of coating polymer deposited on the membrane microstructure. The areal mass of the composite will be less than 75 $\text{gm/m}^2$, preferably less than 50 $\text{gm/m}^2$ and most preferably less than 35 $\text{gm/m}^2$.

In addition to improvement in Z-strength and tensile strength at ambient temperature, the present invention through suitable choice of the coating polymer or polymers may also provide significant other benefits by improving other ambient temperature mechanical properties such as abrasion resistance, stiffness or modulus, compression resistance and creep or dimensional stability.

A wide variety of coating polymers can be used to improve ambient temperature mechanical properties of ePTFE membranes. Such polymers are thermoplastic or thermosetting or elastomeric in nature. Examples of such polymers are polyurethanes, epoxies, polyesters, polystyrene, polyamides, polyphthalamide, polyamide-imides, polyarylates, polycarbonates, polyether-imides, polyethersulphones, polysulfones, polyphenylene sulfides, liquid crystalline polymers, polybenzimidazoles, polyetherketones, polyetheretherketones, and polysiloxanes. Also suitable are various melt processable fluoropolymers such as polyvinylidene fluoride (PVDF) and other copolymers or terpolymers of tetrafluoroethylene (TFE). Examples of such melt processable polymers are fluorinated ethylene propylene (FEP), perfluoroalkoxyalkanes (PFA), ethylene tetrafluoroethylene (ETFE), polychlorotrifluoroethylene (PCTFE), terpolymers of TFE, vinylidenefluoride and hexafluoropropylene (THV); terpolymers of TFE, ethylene and hexafluoropropylene (EFEP); copolymers of TFE with perfluoroalkylvinylethers such as perfluoromethylvinylether (PMVE) or perfluoroethylvinylether (PEVE) or perfluoropropylvinylether (PPVE) as mentioned in U.S. Pat. No. 7,049,380 and U.S. Pat. No. 8,048,440 by Chang and co-workers. Cross-linked elastomers such as FKM, EPDM, NBR or thermoplastic elastomers such as styrene based copolymers (Kraton® from Kraton Polymers), polyamide copolymers (Pebax® from Arkema) or polyester copolymers (Hytrel® from Dupont) can also be suitable coating polymers.

In selected applications, improving the thermal properties along with enhancing the mechanical properties of ePTFE is highly desirable. For example, in an alternative embodiment of the invention, when the composites are exposed in end use to temperatures up to 300° C., it is desired that they exhibit low shrinkage and good dimensional stability. Composites of this alternative embodiment exhibit ATS×Z-strength of at least 50 $(MPa)^2$, a Gurley air flow of less than 500 cc, and shrinkage of less than 10% at temperatures up to 300° C. In such cases, the choice of the coating polymer is further dictated by ensuring that the polymer provides not only improved ambient temperature mechanical properties, but also temperature resistance higher than the use temperature of interest. ASTM tests, such as Heat Distortion temperature test (ASTM D648) and Vicat Softening point test (ASTM D1525) are convenient indicators of the temperature resistance of polymers. Alternatively, maximum service temperature provided by the manufacturer is also a useful guide to the temperature resistance of the polymer. Heat distortion temperature, Vicat softening point and maximum service temperature are readily available in the reference literatures as well as various polymer material related websites such as www.omnexus.com and www.craftechind.com. Another convenient source for the long term service temperature (LTST) of various polymers is the "Periodic Table of Polymers" by Dr. Robin Kent of Tangram Technology Limited, UK and is available at www.pcn.org.

In this high temperature alternative embodiment of the invention, although ePTFE is suitable for continuous and intermittent use at temperatures up to 260° C. and 300° C. respectively, ePTFE is prone to shrinkage at temperatures higher than ambient. The magnitude of the shrinkage depends on the temperature, the orientation and also on the microstructure obtained through the ePTFE processing routes followed. In selected end uses, it is advantageous to reduce this shrinkage at the application temperature. This can be achieved by coating the node and fibril microstructure of the ePTFE with a polymer with suitable temperature resistance while retaining some of the porosity of the starting ePTFE. In addition to reducing shrinkage at elevated use temperature, additional benefits of the coated ePTFE can be in improvement of other mechanical properties (e.g. tensile strength, stiffness or modulus, compression resistance, abrasion resistance, Z-strength etc.) at the same use temperature. Examples of polymers that can be suitable for heat resistance are polyimides, polyamide-imides, polyetherimides, selected polyarylates, selected polysulfones and polybenzimidazoles (PBI). Polyimides can be thermoplastic in nature such as Extem® family of polymers available from Sabic Innovative Plastics (Pittsfield, Mass.). Polyimide precursors such as Pyre-ML® 5083 from Industrial Summit Technology (Parlin, N.J.) or Upilex® from Ube America Incorporated (New York, N.Y.) can also be used. Polyarylates such as Fluorene polyester or FPE from Ferrania Technologies (Savona, Italy) or UNIFINER® from Unitika Limited (Osaka, Japan) are suitable for use in the present invention. High temperature polysulfone such as Epispire® and Torlon® polyamide-imides from Solvay Specialty Polymers (Alpharetta, Ga.) and Vylomax® polyamide-imide resin from Toyobo (Japan) can also be used as the coating polymer. PBI polymers such as Celazole® available from PBI Performance Products (Charlotte, N.C.) can be selected for use in this invention.

Based on the above, this embodiment of the invention describes a porous ePTFE composite with shrinkage of 10% or less at a temperature of 300° C. and below and can be produced by coating the node and fibril microstructure of the ePTFE substrate with a polymer with a suitable temperature resistance. It is apparent to those skilled in the art that if the composite of this invention demonstrates shrinkage of 10% or less at temperature of 300° C. and below; the shrinkage at lower temperatures would be even less. Thus, the present invention can produce ePTFE composites with shrinkage of 10% or less at the targeted application temperature through appropriate choice of the coating polymer. The use temperature range of common interest starts at about 100° C. and extends up to the PTFE service temperature of 300° C. or less. In addition to the polymers mentioned above, depending on the desired use temperature for reduced shrinkage, polymers that can be used are polyurethanes, epoxies, polyesters, polystyrene, polyamides, polyphthalamide, polyamide-imides, polyarylates, polycarbonates, polyether-imides, polyethersulphones, polysulfones, polyphenylene sulfides, liquid crystalline polymers, polybenzimidazoles, polyetherketones, polyetheretherketones, polysiloxanes. Also suitable are various melt processable fluoropolymers such as polyvinylidene fluoride (PVDF) and other copolymers or terpolymers of tetrafluoroethylene (TFE). Examples of such melt processable polymers are fluorinated ethylene propylene (FEP), perfluoroalkoxyalkanes (PFA), ethylene tetrafluoroethylene (ETFE), polychlorotrifluoroethylene (PCTFE), terpolymers of TFE, vinylidenefluoride and hexafluoropropylene (THV), terpolymers of TFE, ethylene and hexafluoropropylene (EFEP), copolymers of TFE with perfluoroalkylvinylethers such as perfluoromethylvinylether (PMVE) or perfluoroethylvinylether (PEVE) or perfluoropropylvinylether (PPVE). Cross-linked elastomers such as FKM, EPDM, NBR or thermoplastic elastomers such as styrene based copolymers (Kraton® from Kraton Polymers), polyamide copolymers (Pebax® from Arkema) or polyester copolymers (Hytrel® from Dupont) may also be used as the coating polymers depending on the application temperature.

Application of the polymer coating 15 onto the surface of the ePTFE microstructure can be achieved in several different ways depending on the polymer chosen. If the polymer is soluble, a solution of the polymer is created in a suitable solvent. More than one polymer can be used to create the desired coating solution. Also, if desired, various soluble additives and insoluble fillers and functional agents can be added to the final coating mix to provide additional functionalities like color, flavor, fragrance, anti-static properties, thermal and electrical conductivities, drug release etc. Care must be taken to ensure that the resulting coating polymer solution wets the porous ePTFE substrate. A good indication of that is if the porous PTFE substrate becomes clear within 30 seconds of placing a drop of the solution on its surface. Generally, a polymer solution will wet the porous PTFE substrate if its surface tension is lower than about 28 dynes/cm. However, wetting can also depend on the porous microstructure, the thickness of the substrate and on the presence of any co-polymer in the composition of the ePTFE membrane. If the solution does not wet due to high surface tension, then wetting solvents with surface tension lower than 28 dynes/cm can be added to the solution as long as it is compatible with the polymer solution. Few examples of common wetting solvents are methylethylketone, isopropyl alcohol, ethyl alcohol, toluene, xylene, ethyl acetate, tetrahydrofuran etc. Alternatively, the ePTFE substrate can be modified to increase the surface energy of the porous ePTFE substrate. This can be achieved by treating ePTFE surface to make it hydrophilic using any of the different methods described in the prior art as mentioned in the background to this invention. Alternatively, the porous PTFE surface can be exposed to high energy radiation such as corona or plasma treatment, but such treatments are not as effective in increasing the surface energy uniformly throughout the entire thickness.

The coating of the microstructure is achieved by saturating the ePTFE substrate, with or without modifying surface treatment, with the polymer solution. Typically, polymer concentration is in the range of 0.5 to 10 weight percent, more commonly in the range of 0.5 to 5 weight percent to preserve most of the original porosity while coating the porous microstructure. Usually, the higher the polymer concentration in the coating solution, the lower is the airflow as evidenced by the increase in Gurley number. The coating solution can be applied to the porous ePTFE using any of the commonly used coating methods or their combinations. Commonly used coating techniques that can be used are dip coating, Mayer rod coating slot die coating, kiss roll coating, spray coating to name a few. Once coated, the wet saturated substrate is dried by running it through a hot air convection oven with and without infra-red heating. If polyimide precursors based on polyamic acid solutions are used, the dried substrate needs to be heated above 200° C. to initiate the imidization reaction and form the polyimide coating. Drying and imidization can be done in one single step or in two separate steps. Similarly, if a thermosetting polymer or elastomer is used, the resulting coating will have to be dried and then cross-linked or cured. During drying, the porous substrate tends to shrink in all three dimensions (i.e., planar x and y, and thickness z). Thus, it is preferred that the substrate is restrained from shrinking in the planar x and y directions. Tenter frame or a pin frame is an example of devices that can be used to provide such restraint during drying. Note that the resulting coated material, while drying, is still free to shrink in the z-direction. Thus the thickness of the coated composite will be lower than that of the starting ePTFE substrate. Another consequence of this effect is that it causes some collapse of the porous microstructure resulting in some loss in air flow or increase in the Gurley number.

In addition to solution coating, the polymer coating can also be deposited from emulsions and dispersions, provided care is taken to ensure that the polymer emulsion used is formulated to wet the ePTFE membrane. If needed, surfactants or solvents can be added to the formulation to ensure wetting of the porous PTFE substrate.

Solution coating is the preferred method for creating the porous air-permeable PTFE composite of the present invention. However, other liquid free coating techniques can also be used. Vapor phase polymer deposition techniques can be used to deposit the polymer coating onto the porous microstructure. Advantages of this method is that it is free of solvents and thickness reduction and air flow loss due to microstructure collapse are significantly less than that resulting from solution coating. Polymers that are known to be most suitable for such vapor deposited coatings are polyacrylates and polyimides. If the polymer is insoluble in commonly used solvents, powder coating technique can also be used as long as the polymers can be made available in the form of a fine powder such that the polymer powder can infiltrate the porous microstructure. Expectedly, the particle size of the polymer powder needs to be significantly smaller than the average pore size of the porous PTFE substrate. Typically, polymer particle size needs to be less than one-third the mean pore size. However, this ratio can be flexible depending also on the orientation of the pores within the microstructure. Once infiltrated, the polymer powder infused ePTFE is heated to fuse the powder and create the coating layer. During heating temperature needs to be above the melting point of the polymer if it is thermoplastic or above the cure temperature of the polymer if it is thermosetting. Polyesters, epoxies, fluorinated ethylene propylene (FEP), EFEP, polyetheretherketone (PEEK), polyfluoroalkoxyalkanes (PFA), ethylenetetrafluoroethylene (ETFE), liquid crystalline polymers (LCP), terpolymers of TFE, vinylidenefluoride and hexafluoropropylene (THV); terpolymers of TFE, ethylene and hexafluoropropylene (EFEP); are examples of some of the polymers that are more suited for this powder based technique to create the composites of the present invention.

Test Methods

Thickness

Thickness of the ePTFE membrane and the resulting composites from it were measured using a non-contact thickness gage (Keyence Model LS-7601). Average of 3 measurements were taken.

Areal Mass

Areal mass of the ePTFE membrane and/or the resulting composite was determined by cutting circular samples with 0.01 m$^2$ in area and weighing them on a balance. An average of at least 3 specimens were used. If needed, the areal mass of the composite can also be calculated from the ePTFE membrane mass and weight % polymer content as follows:

$$\text{Areal mass of the composite} = \frac{100 \times ePTFE \text{ membrane } areal \text{ mass}}{(100 - \text{weight \% polymer})}$$

Bubble Point

The bubble point was measured according to the general teachings of ASTM F31 6-03 using a Capillary Flow Porometer (Model CFP 1500 AEXL, Porous Materials Inc., Ithaca, N.Y.). The sample membrane was placed into the sample chamber and wet with SilWick Silicone Fluid (Porous Materials Inc., Ithaca, N.Y.) having a surface tension of 19.1 dynes/cm. The bottom clamp of the sample chamber had a 2.54 cm diameter, 3.175 mm thick porous metal disc insert (40 micron porous metal disk, Mott Metallurgical, Farmington, Conn.) and the top clamp of the sample chamber had a 3.175 mm diameter hole. Using the Capwin software (version 6.62.1) the following parameters were set as specified in the table immediately below. The values presented for bubble point was the average of two measurements.

| Parameter | Set Point | Parameter | Set Point |
|---|---|---|---|
| Maxflow (cc/m) | 140000 | Mineqtime (sec) | 30 |
| Bublflow (cc/m) | 30 | Presslew (cts) | 10 |
| F/PT (old bubltime) | 50 | Flowslew (cts) | 50 |
| Minbppres (PSI) | 0 | Egiter | 3 |
| Zerotime (sec) | 1 | Aveiter | 20 |
| V2incr (cts) | 10 | Maxpdif (PSI) | 0.1 |
| Preginc (cts) | 1 | Maxfdif (cc/m) | 50 |

-continued

| Parameter | Set Point | Parameter | Set Point |
|---|---|---|---|
| Pulse delay (sec) | 2 | Sartp (PSI) | 1 |
| Maxpre (PSI) | 500 | Sartf (cc/m) | 500 |
| Pulse width (sec) | 0.2 | | |

Gurley Measurements

The Gurley air flow test measures the time in seconds for 100 cm³ of air to flow through a 6.45 cm² sample at 12.4 cm of water pressure. The sample was measured in a Gurley Densometer Model 4340 Automatic Densometer. Average of 3 measurements was used.

Surface Area Measurements

The surface area per unit mass, expressed in units of m²/g, of the ePTFE membrane was measured using the Brunauer-Emmett-Teller (BET) method on a Coulter SA3100 Gas Adsorption Analyzer (Beckman Coulter Inc., Fullerton, Calif.). A sample was cut from the center of the ePTFE membrane sheet and placed in a small sample tube (reference number 8201151). The mass of the ePTFE sample was approximately 0.1 to 0.2 grams. The tube was placed in the Coulter SA-Prep Surface Area Outgasser, (Model SA-PREP, P/N 5102014) from Beckman Coulter, Inc., Fullerton, Calif., and purged at 110 C for 2 hours with helium. The sample tube was then removed from the SA-Prep Outgasser and weighed. The sample tube was then placed into the SA3100 Gas Adsorption Analyzer and the BET surface area analysis was run in accordance with the instrument instructions using helium to calculate the free space and nitrogen as the adsorbate gas. A single measurement was recorded for each sample.

Tensile Strength

Tensile strength was measured under ambient conditions using an Instron tensile testing machine (Model 5500) equipped with a 100N load cell. 25.4 mm wide by 101.6 mm long specimens were cut from the sample with the long direction aligned with the test direction. The specimens were clamped between flat faced Instron grips spaced 50.8 mm apart. Three specimens were tested at the rate of 508 mm/min until the specimens broke. Tensile Strength in the test direction was calculated as follows:

Tensile strength,MPa=(Average maximum Load to break,$N$)/(Width,mm×average thickness,mm)

Tensile tests were performed in both the down web or machine direction (MD) or x-direction and in the cross-web or Transverse direction (TD) or y-direction. If down-web or cross-web directions are not identified, then tensile tests can be performed in two orthogonal directions in the plane of the sample. As specified earlier, AverageTensile Strength (ATS) was calculated from these two tensile strength values.

Z-Strength Test

The cohesive strength of the ePTFE membrane and the composites made using them was measured under ambient conditions using a TAPPI-541 (Zwick, Germany) device. A 75 mm×130 mm piece of two-sided adhesive tape, such as 9500PC (3M Corporation), was attached to similar sized face of the bottom platen. A sample of the composite or of the ePTFE membrane, with its machine direction oriented in the long direction of the platen, was placed over the tape covered bottom platen. The membrane in between each of the five 25.4 mm×25.4 mm test areas was slit with a scalpel to isolate the test samples. The upper platen, which has identical five 25.4 mm×25.4 mm test areas, was covered with the same two sided adhesive tape. The upper & bottom platens were mounted in an Instron tensile testing machine with the two platens aligned at a 90 degree angle to each other. The platens with the sample in between were compressed together to 3.16 kN at a rate of 12.7 mm/min and held under that force for 30 seconds. The compressive force was then reduced to zero at a rate of 12.0 kN/min. After 7.5 seconds of force removal, the platens were separated at the rate of 50.8 mm/min and the maximum force, in Newtons, to separate the platen was recorded. If the failure is cohesive in nature, the failed sample would be covering the surfaces of both the platens. If the cohesive strength of the sample is greater than the adhesive strength of the tape to the platens or of the tape to the sample, both the platens will not be covered with failed portion of both the samples. Samples in each of the 5 test areas were measured as above and $F_{avg}$, the average of five maximum force values, is calculated. The Z-strength of the sample in MPa=($F_{avg}$ in Newton)/(645.16 mm²).

In the above procedure, care must to taken to ensure that the adhesive tape adheres only to the top and bottom surfaces of the porous test sample. The adhesive from the adhesive tape should not penetrate into the cross-section of the sample under the bonding pressure, as that can alter the Z-strength measurement. This can be checked by obtaining a SEM (scanning electron microscope) image of the sample cross-section after adhesive attachment. If adhesive infiltration into the sample is observed, the 3.16 KN bonding pressure needs to be reduced until no infiltration occurs. Such adjustment of the bonding pressure is most likely necessary for samples with low areal mass.

Shrinkage

The heat stability of the composite or of the uncoated ePTFE membrane was assessed by separately measuring the shrinkage in the down-web (MD) as well as in the cross-web direction (TD). In particular, a 14 cm×17.8 cm specimen was die cut from the test sample with the longer side oriented perpendicular to the test direction of the sample. At the mid-point of the long side of the specimen, a line was marked across the specimen. The length, $L_o$, of this mid-point line is 14 cm. The specimen was then mounted onto a 14 cm×14 cm pin-frame. Only 14 cm of the longer (17.8 cm) side of the specimen was constrained within the pins. The shorter 14 cm side, aligned with the test direction, was left unrestrained. The pin-frame with the specimen was then heated in a hot-air convection oven at the test temperature for 5 minutes. Upon cooling to ambient, the specimen was removed from the pin-frame and the length, L, of the mid-point line was measured. Shrinkage in the test direction and at the test temperature was calculated as follows:

% shrinkage=100×($L_o$-L)/$L_o$

The shrinkage test was done in both the down web or machine direction (MD) or x-direction and in the cross-web or Transverse direction (TD) or y-direction. If down-web or cross-web directions are not identified, then tensile tests can be performed in two orthogonal directions in the plane of the sample.

Apart from the shrinkage test, all other tests were conducted under ambient laboratory conditions of around 25° C. and 50% relative humidity.

Polymer Content

TGA Method

TA instrument's Q5000IR TGA was used to determine the weight percentage of the polyurethane in the composite of Example 4. A small sample of the composite was heated from ambient temperature to 800° C. at 5° C./min in air. The instrument recorded the % weight loss of the sample as a function of temperature. The % weight loss below 400° C. was taken to be the weight % polyurethane within the composite sample.

NMR Method

A solid-state NMR based method is used to determine the polyimide content of the composites in Examples 1 to 3 and in Example 5. Details of the test method are as follows.

A sample of approximately 8 to 25 mg (depending on density and other sample characteristics) is packed into a 2.5 mm solid state NMR Rotor. The mass is measured by weighing the rotor before and after adding the sample. The sample is spun following high-speed spinning protocol at approximately 28.5 kHz for $^{19}$F NMR detection. The solid state $^{19}$F NMR spectrum is acquired using parameters appropriate for PTFE. Suggested parameters for a Bruker 300 MHz NMR running Topspin software are: zg pulse sequence, p1=0.40 usec (12° flip angle), d1=3 s, sw≥402 PPM and ns=50. The parameters are to be identical to those used when collecting reference spectra of PTFE samples with varying masses added to the NMR rotors. The data is processed using appropriate parameters to obtain the $^{19}$F NMR spectrum, checking that the PTFE $CF_2$ peak position is approximately −122 PPM. The peak region is integrated between approximately −103 PPM and approximately −147 PPM, checking for an appropriate integral baseline and shape and using the integration option 'Use lastscale for calibration' in which the lastscale is consistent with that used for the reference PTFE samples.

The relative peak area of the sample spectrum is compared to the calibration curve (peak area versus PTFE mass). This will give the measured mass of PTFE present in the sample rotor. Note the calibration curve is created by collecting the $^{19}$F NMR spectra of a series of PTFE samples using parameters identical to those used as mentioned earlier. The curve should contain integrated peak data for PTFE reference samples ranging from a mass of approximately 0.5 mg to a mass of approximately 15 mg (when using 2.5 mm NMR rotors). The measured PTFE mass is then compared to the total sample mass. The difference between these masses is equal to the polyimide portion of the sample.

EXAMPLES

Example 1

Figure 3:
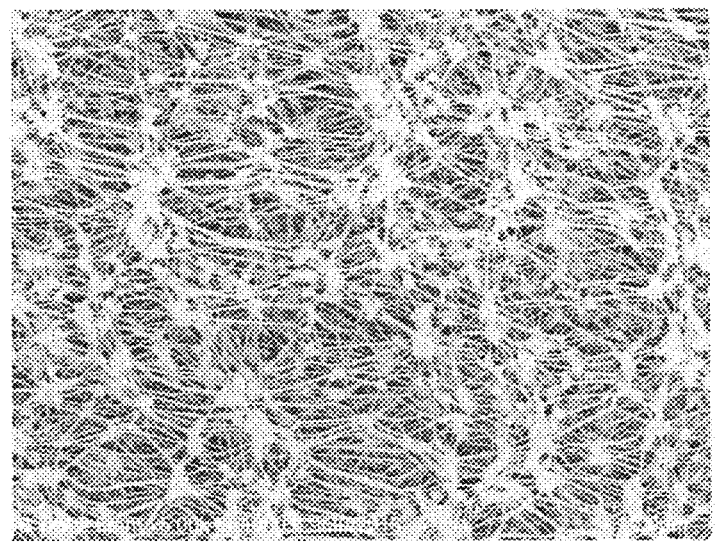
FIG. 3 is a scanning electron micrograph of the surface of the ePTFE starting membrane used in Example 1.

A porous ePTFE membrane, depicted in FIG. 3, with the following properties was obtained from W.L. Gore and Associates, Inc., Elkton, Md.:
Mass per area=19.7 gm/m$^2$
Bubble point=20.3 psi
Surface Area=8.1 m$^2$/gm.

A coating mix was prepared by diluting commercially available polyimide wire enamel (Pyre ML RC-5083, Industrial Summit Technology, Parlin, N.J.) with methylethylketone (MEK) and dimethylacetarnide (DMAC). The resulting coating mix had 5.5% solids and the solvent system contained about 70 weight percent MEK. This coating mix was applied onto the ePTFE membrane using a #8 Mayer rod at a speed of about 1 m/min. The wet membrane was then put onto a tenter frame in order to restrain from shrinkage and dried by passing through a forced air convection oven set at about 172° C. at a line speed of 1 m/min and then collected on roll.

Figure 4A:
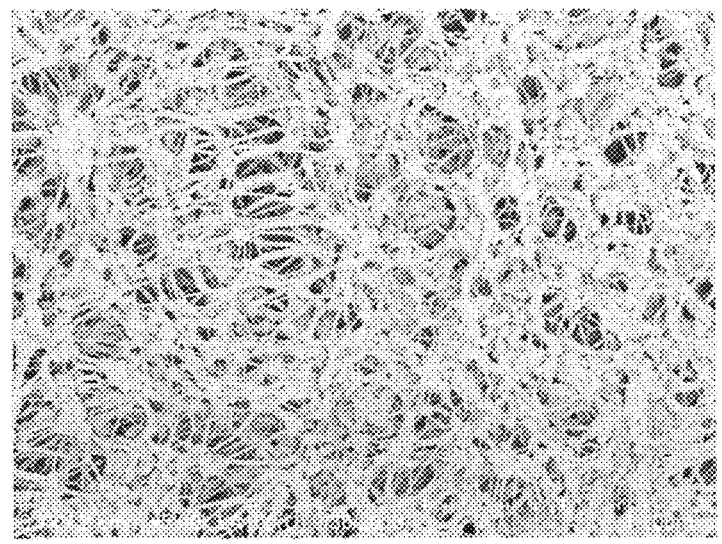
FIGS. 4a and 4b show the scanning electron micrographs of the top and bottom surfaces of the porous PTFE composite of this invention described in Example 1.
Figure 4B:
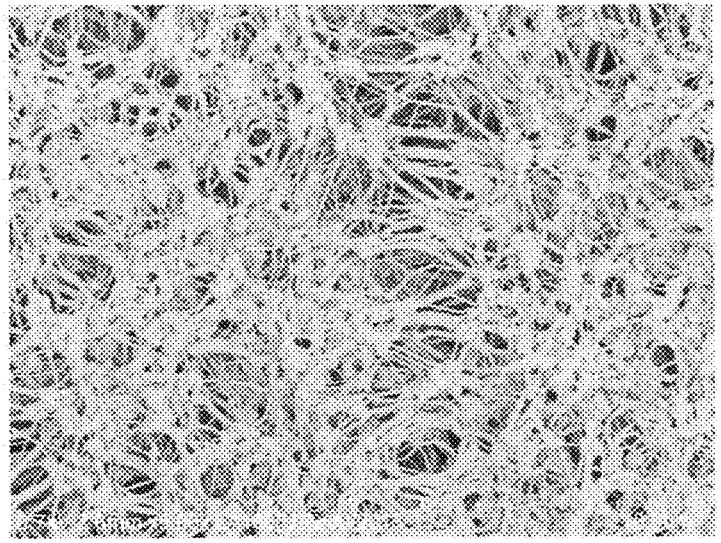

In order to reduce the residual solvent content as well as to imidize the coating, the dried composite membrane was then again restrained on a tenter frame and run through an 8 foot long infrared (IR) oven at a speed of 0.6 m/min where it was heated to about 340° C. Resulting composite membrane then was collected on a roll. FIGS. 4a and 4b show the SEM micrographs of the top and bottom surfaces of the porous, air-permeable composite material. This composite membrane, having a polyimide coating over its microstructure, was also tested for polyimide content, air flow, tensile strength, Z-strength, and shrinkage.

The tensile strength and shrinkage measurements for this and all subsequent examples were performed in the machine (MD) and transverse (TD) directions of the coated material. The results for this Example 1 are shown in Table I

TABLE I

| Measured Properties | Starting ePTFE Membrane used in Example 1 | ePTFE Composite of Exampe 1 |
|---|---|---|
| Polyimide Content, weight % | 0.0 | 12.9 |
| Gurley flow, sec/100 cc | 14.3 | 45 |
| Areal mass, gm/m2 | 19.7 | 23.9 |
| Tensile Strength in MD, MPa | 7.1 | 21.1 |
| Tensile Strength in TD, MPa | 25.0 | 45.1 |
| Z-strength, MPa | 1.23 | >3.08** |
| Average Tensile Strength × Z strength (MPa$^2$) | 19.7 | >101.9** |
| MD Shrinkage at 250° C., % | 11.3 | 1.4 |
| TD Shrinkage at 250° C., % | 25.7 | 1.8 |
| MD Shrinkage at 300° C., % | 25.0 | 1.8 |
| TD Shrinkage at 300° C., % | 32.1 | 2.9 |

**instrument limit as failure occurred in the adhesive platen interface and not in the test sample.

Results show significant increase in tensile strength, Z-strength and Average Tensile Strength×Z strength of the porous composite due to the polyimide coating, while maintaining significant air permeability. The shrinkage also is dramatically reduced up to temperatures as high as 300° C.

Example 2

A porous ePTFE membrane was made with the following properties:
Mass per area=8.7 gm/m$^2$
Bubble point=17.3 PSI
Surface Area=11.2 m$^2$/gm A coating mix was prepared by diluting commercially available polyimide wire enamel (Pyre ML RC-5083, Industrial Summit Technology, Parlin, N.J.) with MEK & DMAC. The resulting coating mix had 3.7% solids and the solvent system contained about 70 weight percent MEK. The ePTFE membrane was coated, dried and imidized as in Example 1 and then tested. The results are shown in Table II

TABLE II

| Measured Properties | Starting ePTFE Membrane used in Example 2 | ePTFE Composite of Example 2 |
|---|---|---|
| Polyimide Content, weight % | 0.0 | 9.3 |
| Gurley flow, sec/100 cc | 7.2 | 23.3 |
| Areal mass, gm/m2 | 8.7 | 10.7 |
| Z-strength, MPa | 0.18 | 1.62 |
| Tensile Strength in MD, MPa | 38.3 | 87.2 |
| Tensile Strength in TD, MPa | 11.9 | 27.01 |
| Average Tensile Strength × Z strength (MPa$^2$) | 4.6 | 92.5 |
| MD Shrinkage at 250° C., % | 38.9 | 0.7 |
| TD Shrinkage at 250° C., % | 35.4 | 1.6 |
| MD Shrinkage at 300° C., % | 42.9 | 1.4 |
| TD Shrinkage at 300° C., % | 35.7 | 1.4 |

Results show significant increase in tensile strength, Z-strength, and Average Tensile Strength×Z-strength, and a reduction in shrinkage of the porous composite at temperatures of 300° C. and below due to the polyimide coating while retaining considerable air flow properties.

Example 3

A porous ePTFE membrane made in the same manner as the starting material used for Example 1 was used in this example.

Thermoplastic polyimide pellets (Extem® XH1005 from Sabic Innovative Plastics, Pitsfield, Mass.) were dissolved in DMAc to create a 20 weight percent solution. This solution was then diluted with tetrahydrofuran (THF) to create a coating mix at 5.5 weight percent solids and the solvent system contained 83.3 weight percent THF. The ePTFE membrane was coated with this mix using a #16 Mayer rod at 1 m/min line speed and dried with the convection ovens set at about 169° C. In order to reduce residual solvent, the dried composite film was then further post treated on a tenter frame by heating to about 280° C. through an IR oven at a line speed of about 3 m/min.

The resulting composite membrane, having a polyimide coating, was tested for polyimide content, air flow, tensile strength, z-strength, and shrinkage. The results are shown in Table III.

TABLE III

| Measured Properties | Starting ePTFE Membrane used in Example 3 | ePTFE Composite of Example 3 |
|---|---|---|
| Polyimide Content weight % | 0.0 | 17.6 |
| Gurley flow, sec/100 cc | 16.7 | 29.8 |
| Areal mass, gm/m2 | 19.7 | 27 |
| Z-strength, MPa | 1.44 | 2.33 |
| Tensile Strength in MD, MPa | 8.3 | 18.8 |
| Tensile Strength in TD, MPa | 27.8 | 38.5 |
| Average Tensile Strength × Z Strength (MPa$^2$) | 26.0 | 66.7 |
| MD Shrinkage at 250° C., % | 11.3 | 0.4 |
| TD Shrinkage at 250° C., % | 25.7 | 1.4 |

Results show significant increase in tensile strength, Z-strength, and Average Tensile Strength×Z Strength and decrease in shrinkage of the air permeable porous composite due to the thermoplastic polyimide coating with a temperature resistance of about 250° C. to 260° C.

Example 4

A porous ePTFE membrane made in the same manner as the starting material used for Example 2 was used here. Thermoplastic polyurethane pellets (Pellethane® 2363-75D from Lubrizol, Wilmington, Del.) were dissolved in DMAc to create a 25 weight percent solution. This solution was then diluted with MEK to create a coating mix at 2.1 weight percent solids and the solvent system contained 75 weight percent MEK. The ePTFE membrane is coated with this mix using a #32 Mayer rod at 1 m/min line speed and dried with the convection ovens set at about 169° C. In order to reduce residual solvent, the dried composite film was then further post treated on a tenter frame by heating to about 177° C. through an IR oven at a line speed of 3 m/min.

The resulting composite membrane, having a polyurethane coating, was tested for air flow, tensile strength, Z-strength and shrinkage. The results are shown in Table IV

TABLE IV

| Measured Properties | Starting ePTFE Membrane used in Example 4 | ePTFE Composite of Example 4 |
|---|---|---|
| Polyurethane Content, weight % | 0.0 | 7.9 |
| Gurley flow, sec/100 cc | 6.6 | 41.4 |
| Areal mass, gm/m2 | 8.7 | 10.7 |
| Z-strenth, MPa | 0.18 | 2.36 |
| Tensile Strength in MD, MPa | 42.5 | 63.8 |
| Tensile Strength in TD, MPa | 16.3 | 26.3 |
| Average Tensile Strength × Z Strength | 5.4 | 106.4 |
| MD Shrinkage at 100° C., % | 7.9 | 0.7 |
| TD Shrinkage at 100° C., % | 12.9 | 0.7 |
| MD Shrinkage at 150° C., % | 18.6 | 2.9 |
| TD Shrinkage at 150° C., % | 17.1 | 1.4 |
| MD Shrinkage at 250° C., % | 38.6 | 16.1 |
| TD Shrinkage at 250° C., % | 35.4 | 24.3 |

Results show significant increase in tensile strength, Z-strength and Average Tensile Strength×Z Strength of the air permeable ePTFE composite due to the thermoplastic polyurethane coating. These results also show how shrinkage can be controlled by the coating polymer choice. Since the temperature resistance of the polyurethane polymer used is about 115° C. to 120° C., shrinkage at 100° C. is considerably reduced due to the polyurethane coating. At 150° C., shrinkage was still reduced appreciably whereas at much higher 250° C. temperature, the polyurethane coating has limited effect in reducing shrinkage due to its limited thermal stability at this temperature.

Example 5

Figure 5:
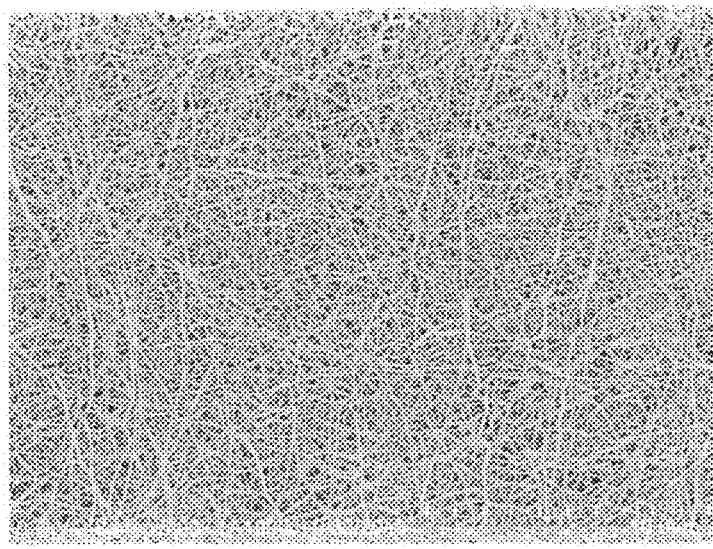
FIG. 5 is a scanning electron micrograph of the surface of the starting ePTFE membrane used in Example 5.

A high tensile strength porous PTFE membrane, shown in FIG. 5, with the following properties was obtained from W.L. Gore and Associates, DE:
  Mass per area=7.6 gm/m$^2$
  Bubble point=112.6 PSI
  Surface Area=26.7 m$^2$/gm.

Thermoplastic polyimide pellets (Extem® XH1005 from Sabic Innovative Plastics, Pitsfield, Mass.) was dissolved in DMAc to create a 20 weight percent solution. This solution was then diluted with THF to create a coating mix at 3 weight percent solids and the solvent system contained 83.3 weight percent THF. The ePTFE membrane was coated with this mix using a #8 Mayer rod at 1 m/min line speed and dried with the convection ovens set at 169° C. In order to reduce residual solvent, the dried composite film was then further post treated on a tenter frame by heating to about 280° C. through an IR oven at a line speed of 3 m/min.

Figure 6A:
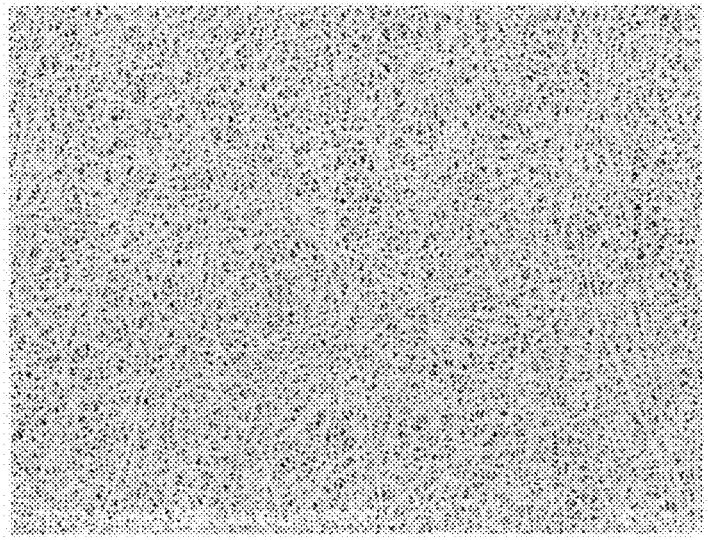
FIGS. 6a and 6b are scanning electron micrographs of the top and bottom surfaces of the porous PTFE composite of this invention described in Example 5.
Figure 6B:
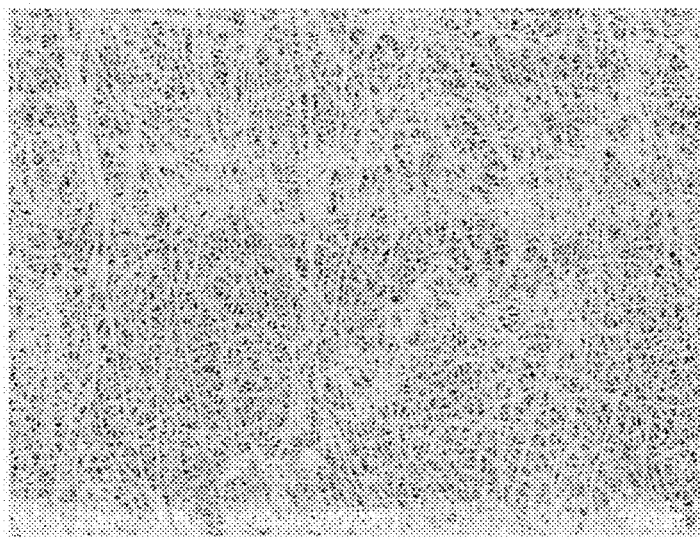

FIGS. 6a and 6b show the SEM micrographs of the top and bottom surfaces of the resulting porous, air permeable composite. This composite membrane, having a polyimide coating, was also tested for air flow, tensile strength, Z-strength, and shrinkage. The results are shown in Table V.

TABLE V

| Measured Properties | Starting ePTFE Membrane used in Example 5 | ePTFE Composite of Example 5 |
|---|---|---|
| Polyimide Content, weight % | 0.0 | 12.4 |
| Gurley flow, sec/100 cc | 30 | 283 |
| Areal mass, gm/m2 | 7.6 | 9.4 |
| Z-strength, MPa | 0.075 | 0.543 |
| Tensile Strength in MD, MPa | 59.2 | 219.7 |
| Tensile Strength in TD, MPa | 68.9 | 224.9 |

TABLE V-continued

| Measured Properties | Starting ePTFE Membrane used in Example 5 | ePTFE Composite of Example 5 |
|---|---|---|
| Average Tensile Strength × Z Strength (MPa$^2$) | 4.7 | 120.7 |
| MD Shrinkage at 250° C., % | 56.8 | 7.1 |
| TD Shrinkage at 250° C., % | 60.2 | 6.4 |

Results show significant increase in tensile strength, Z-strength, Average Tensile Strength×Z-strength, and decrease in the shrinkage of the air permeable porous composite due to the thermoplastic polyimide coating with a temperature resistance of about 250° C. to 260° C.

Comparative Example A

This comparative example illustrate that hydrophilic ePTFE membrane of prior art does not possess the increased mechanical properties of the present invention.

An ePTFE membrane with a mass of about 11.8 grams/m$^2$ and Gurley air flow of about 4.5 seconds was tested for hydrophilicity. It was found to be hydrophobic since drops of deionized water placed on the opaque white membrane did not wet the membrane even after 60 minutes.

Using prior art teaching, such as in U.S. Pat. No. 5,874,165, the ePTFE membrane was made hydrophilic by solution coating the ePTFE microstructure with polyvinyl alcohol polymer followed by cross-linking with glutaraldehyde system. Hydrophilicity was checked by placing drops of deionized water on the coated membrane and within 30 seconds the coated membrane was completely wetted by the water and became transparent. The Gurley airflow of the coated membrane was about 5.5 seconds. The coated ePTFE was tested for mechanical properties, and the ATS and Z-strength and values were 24.5 MPa and 0.44 MPa respectively. Corresponding value of ATS×Z-strength was 10.8 MPa$^2$ which is significantly lower than the values for the ePTFE composites of the present invention.

Comparative Example B

This comparative example illustrate that ePTFE coated just to make it oleophobic does not lead to increased mechanical properties. An ePTFE membrane with a mass of about 22 grams/m$^2$ and Gurley air flow of about 16.5 seconds was tested for oleophobicity using the oil repellency test specified in U.S. Pat. No. 6,074,738. It was found to have an oil rating of #1.

Using prior art teaching, for example as in U.S. Pat. No. 6,074,738, above ePTFE membrane was made oleophobic by coating the ePTFE microstructure with an aqueous fluoropolymer mixture. The coated ePTFE membrane had an oil rating of #6. The Gurley airflow of the coated membrane was about 25 seconds. The coated ePTFE was tested for mechanical properties, and the ATS and Z-strength values were 21.7 MPa and 0.79 MPa respectively. Corresponding value of ATS×Z-strength was 17.1 MPa$^2$ which is significantly lower than the values for the ePTFE composites of the present invention.

While particular embodiments of the present invention have been illustrated and described herein, the present invention should not be limited to such illustrations and descriptions. It should be apparent that changes and modifications may be incorporated and embodied within the scope of the following claims.

What is claimed is:

1. An article comprising:
   a porous, air-permeable composite comprising
      an expanded polytetrafluoroethylene (ePTFE) substrate having a microstructure comprising nodes, fibrils, and pores, said nodes being interconnected by said fibrils and said pores being a void space between said nodes and fibrils; and
      at least one polyimide coating, wherein said polyimide coating conforms to surfaces of said nodes and fibrils throughout a thickness of said ePTFE substrate without occluding said pores of said ePTFE substrate, and wherein said polyimide coating comprises a polyimide content from 0.5 to 5 percent by weight,
   wherein said composite exhibits a Gurley air flow of less than 500 seconds and a product of average tensile strength (ATS)×Z Strength of at least 100 MPa$^2$.

2. The article of claim 1, wherein said composite has a strength in the z-direction of at least 0.4 MPa.

3. The article of claim 1, wherein said composite exhibits a Gurley air flow of 100 seconds or less.

4. The article of claim 1, wherein said article further comprises at least one filler.

5. The article of claim 1, wherein said composite comprises at least two ePTFE layers.

6. The article of claim 1, wherein said composite has an areal mass of 75 gm/m$^2$ or less.

7. The article of claim 1, wherein said composite has a Z strength of at least 0.4 MPa at room temperature.

8. An article comprising:
   a porous, air-permeable composite comprising
      an expanded polytetrafluoroethylene (ePTFE) substrate having a microstructure comprising nodes, fibrils, and pores, said nodes being interconnected by said fibrils and said pores being a void space between said nodes and fibrils; and
      at least one polyimide coating, wherein said polyimide coating conforms to surfaces of said nodes and fibrils throughout a thickness of said ePTFE substrate without occluding said pores of said ePTFE substrate, and wherein said polyimide coating comprises a polyimide content from 0.5 to 5 percent by weight,
   wherein said composite exhibits a Gurley air flow of less than 500 seconds, a mass per area of 75 gm/m$^2$ or less, and a shrinkage of less than 10% in at least one direction when measured at a temperature of 200° C.

9. The article of claim 8, wherein composite exhibits a Gurley air flow of 100 seconds or less.

10. The article of claim 8, wherein said ePTFE substrate further comprises at least one filler within its microstructure.

11. The article of claim 8, wherein said composite comprises at least two ePTFE layers.

12. An article comprising:
   a porous, air-permeable composite comprising
      an expanded polytetrafluoroethylene (ePTFE) substrate having a microstrueture comprising nodes, fibrils, and pores, said nodes being interconnected by said fibrils and said pores being a void space between said nodes and fibrils; and
      at least one polyimide coating wherein said polyimide coating conforms to surfaces of said nodes and fibrils throughout a thickness of said ePTFE substrate without occluding said pores of said ePTFE substrate, and wherein said polyimide coating comprises a polyimide content from 0.5 to 5 percent by weight,
   wherein said composite exhibits a Gurley air flow of less than 500 seconds, a mass per area of 75 gm/m$^2$ or less, and a shrinkage of less than 10% in at least one direction when measured at a temperature of 300° C.

13. The article of claim 12, wherein said composite article exhibits a Gurley air flow of 100 seconds or less.

14. The article of claim 12, wherein said ePTFE substrate further comprises at least one filler within its microstructure.

15. The article of claim 12, wherein said composite comprises at least two ePTFE layers.

16. An article comprising:

a porous, air-permeable composite comprising an expanded polytetrafluoroethylene (ePTFE) substrate having a microstructure comprising nodes, fibrils, and pores, said nodes being interconnected by said fibrils and said pores being a void space between said nodes and fibrils; and at least one polyimide coating, wherein said polyimide coating conforms to surfaces of said nodes and fibrils throughout a thickness of said ePTFE substrate without occluding said pores of said ePTFE substrate, and wherein said polyimide coating comprises a polyimide content from 0.5 to 5 percent by weight, wherein said composite exhibits a Gurley air flow of less than 500 seconds and shrinkage of less than 10% in at least one direction when measured at a temperature of 300° C.

17. An article comprising;

a porous, air-permeable composite comprising an expanded polytetrafluoroethylene (ePTFE) substrate having a microstructure comprising nodes, fibrils, and pores, said nodes being interconnected by said fibrils and said pores being a void space between said nodes and fibrils; and at least one polyimide coating, wherein said polyimide coating conforms to surfaces of said nodes and fibrils throughout a thickness of said ePTFE substrate without occluding said pores of said ePTFE substrate, and wherein said polyimide coating comprises a polyimide content from 0.5 to 5 percent by weight, wherein said composite exhibits a Gurley air flow of less than 500 seconds, a mass per area of less than 75 gm/m$^2$, a Z-strength of at least 0.4 MPa at room temperature and, a shrinkage of less than 10% in at least one direction when measured at a temperature of 300° C.

* * * * *

UNITED STATES PATENT AND TRADEMARK OFFICE
CERTIFICATE OF CORRECTION

PATENT NO. : 9,862,859 B2
APPLICATION NO. : 14/850434
DATED : January 9, 2018
INVENTOR(S) : Anit Dutta and Leslie S. Nachbar It is certified that error appears in the above-identified patent and that said Letters Patent is hereby corrected as shown below:

In the Claims

At Column 18, Claim 12, Line 56, please replace "microstrueture" with "microstructure".

Signed and Sealed this
Thirty-first Day of July, 2018

Andrei Iancu
*Director of the United States Patent and Trademark Office*